(12) United States Patent
Zhong et al.

(10) Patent No.: US 10,293,286 B2
(45) Date of Patent: May 21, 2019

(54) WATER PURIFICATION DEVICE BASED ON FILTER CARTRIDGE ANTI-COUNTERFEITING IDENTIFICATION

(71) Applicant: FOSHAN SHUNDE APOLLO AIR-CLEANER CO., LTD., Foshan, Guangdong (CN)

(72) Inventors: Yaowu Zhong, Guangdong (CN); Qing'en Li, Guangdong (CN); Xiaochun Pi, Guangdong (CN)

(73) Assignee: FOSHAN SHUNDE APOLLO AIR-CLEANER CO., LTD., Foshan (CN)

( * ) Notice: Subject to any disclaimer, the term of this patent is extended or adjusted under 35 U.S.C. 154(b) by 0 days.

(21) Appl. No.: 15/890,386

(22) Filed: Feb. 7, 2018

(65) Prior Publication Data

US 2018/0154292 A1 Jun. 7, 2018

Related U.S. Application Data

(63) Continuation of application No. PCT/CN2015/070840, filed on Jan. 16, 2015.

(30) Foreign Application Priority Data

Dec. 8, 2014 (CN) .......................... 2014 1 0748405

(51) Int. Cl.
*B01D 35/143* (2006.01)
*B01D 61/02* (2006.01)
(Continued)

(52) U.S. Cl.
CPC ......... *B01D 35/143* (2013.01); *B01D 61/025* (2013.01); *B01D 61/04* (2013.01);
(Continued)

(58) Field of Classification Search
None
See application file for complete search history.

(56) References Cited

U.S. PATENT DOCUMENTS

| 5,503,735 A | * | 4/1996 | Vinas ...................... B01D 61/12 |
| | | | 134/111 |
| 2008/0233577 A1 | * | 9/2008 | Oberstrass ......... C12N 15/1048 |
| | | | 435/6.11 |

(Continued)

FOREIGN PATENT DOCUMENTS

| CN | 1689683 A | 11/2005 |
| CN | 102486823 A | 6/2012 |

(Continued)

OTHER PUBLICATIONS

International Search Report of PCT Patent Application No. PCT/CN2015/070840 dated Sep. 11, 2015.

(Continued)

*Primary Examiner* — Chester T Barry

(57) ABSTRACT

Disclosed is a water purification device based on filter cartridge anti-counterfeiting identification, comprising a filter cartridge assembly (1), a booster pump (2) and a membrane filter assembly (3); a water inlet and a water outlet of the filter cartridge assembly (1) are connected respectively to a water supply pipe and the booster pump (2), the water outlet of the booster pump is connected to a water inlet of the membrane filter assembly (3). The filter cartridge assembly (1) and the membrane filter assembly (3) are respectively provided with an identification chip to be identified and paired with an identifier installed on the water purification device; the booster pump (2) is connected to the identifier; the identifier transmits a signal to propel the booster pump (2) to work only after the identification chips are identified and paired with the identifier.

16 Claims, 2 Drawing Sheets

(51) Int. Cl.
  *B01D 61/10*    (2006.01)
  *B01D 61/12*    (2006.01)
  *C02F 1/44*     (2006.01)
  *C02F 9/00*     (2006.01)
  *B01D 61/22*    (2006.01)
  *B01D 61/04*    (2006.01)
  *B01D 61/14*    (2006.01)
  *C02F 1/28*     (2006.01)

(52) U.S. Cl.
  CPC ............ *B01D 61/10* (2013.01); *B01D 61/12* (2013.01); *B01D 61/145* (2013.01); *B01D 61/22* (2013.01); *C02F 1/444* (2013.01); *C02F 9/005* (2013.01); *B01D 2201/52* (2013.01); *B01D 2201/56* (2013.01); *B01D 2311/04* (2013.01); *B01D 2311/06* (2013.01); *B01D 2313/18* (2013.01); *C02F 1/283* (2013.01); *C02F 1/441* (2013.01); *C02F 2201/005* (2013.01); *C02F 2201/006* (2013.01); *C02F 2209/005* (2013.01); *C02F 2209/008* (2013.01); *C02F 2209/445* (2013.01)

(56) References Cited

U.S. PATENT DOCUMENTS

2012/0323375 A1* 12/2012 Dean-Hendricks ... F24F 3/1603
                     700/276

2015/0123702 A1* 5/2015 McKinley ............ H01L 21/265
                     326/8

FOREIGN PATENT DOCUMENTS

| CN | 202962103 U | 6/2013 |
|---|---|---|
| CN | 203530047 U | 4/2014 |
| CN | 104086013 A | 10/2014 |

OTHER PUBLICATIONS

1st Office Action of counterpart Chinese Patent Application No. 201410748405.3 dated Oct. 8, 2015.
2nd Office Action of counterpart Chinese Patent Application No. 201410748405.3 dated Mar. 17, 2016.
3rd Office Action of counterpart Chinese Patent Application No. 201410748405.3 dated Sep. 14, 2016.
Taiyuan No. 1 Thermal Power Plant, The System and Apparatus of Chemical Water Treatment, May 2008, paragraph 1 on p. 265, Beijing: China Electric Power Press.
Dapeng Yan, et al., The Utilization and Application of Unconventional Water Resources, Nov. 2013, Table 3-2 and Table 3-3 on pp. 44-45, Zhengzhou: The Yellow River Water Conservancy Press.
Duo Zhang, The Products and Application of Auto Identification Technology, Sep. 2009, p. 167, Wuhan: Wuhan University Press.

* cited by examiner

WATER PURIFICATION DEVICE BASED ON FILTER CARTRIDGE ANTI-COUNTERFEITING IDENTIFICATION

CROSS-REFERENCE TO RELATED APPLICATIONS

The present application is a Continuation Application of PCT application No. PCT/CN2015/070840 filed on Jan. 16, 2015, which claims the priority of Chinese Patent Application No. 201410748405.3 filed on Dec. 8, 2014. The contents of the above are hereby incorporated by reference.

FIELD OF THE INVENTION

The present invention relates to water purification devices, in particular, to a water purification device based on filter cartridge anti-counterfeiting identification.

BACKGROUND OF THE INVENTION

Despite the fact that tap water having been filtered, settled, sterilized etc. and meeting the government standards for drinking water, the tap water in daily use is inevitably going through second contamination when it is carried in the pipeline due to the rust on the pipeline or external infiltration, which may bring excessive bacteria, viruses, residual chlorine, organic materials, heavy metal, radioactive substances and other various hazardous substances to the tap water. A water purification device is therefore a device that could filter out all these undesirable substances.

Since access to hygienic drinking water has drawn public attention in recent years, water purification device is widely used in daily life. Various water purification devices purify water depending on filter cartridges; therefore a filter cartridge is the core of water purification devices. There is a need for replacement of the filter cartridge on a regular basis to keep better purifying effect. A high demand for water purification devices keeps increasing in the current market, however a large amount of counterfeiting filter cartridges arise. If the material quality of filter cartridges cannot be guaranteed, the purifying effect will be in adverse as opposed to using an original filter cartridge. The use of such counterfeiting filter cartridge cannot bring desirable purifying effect or meet standards for drinking water; instead, the operational life span of such counterfeiting filter cartridge is short, use of which is adverse to the health of consumers and the reputation of manufacturers.

SUMMARY OF THE INVENTION

In order to solve the existing spread of counterfeiting filter cartridge products, the present invention provides a water purification device based on filter cartridge anti-counterfeiting identification. The water purification device could function only when the original filter cartridge passes the identification process, which guarantees the quality of purified water.

In order to realize the above-mentioned goal, the present invention provides a water purification device based on filter cartridge anti-counterfeiting identification which comprises a filter cartridge assembly, a booster pump and a membrane filter assembly. A water inlet and a water outlet of the filter cartridge assembly are connected respectively to a water supply pipe and the booster pump. The water outlet of the booster pump is connected to a water inlet of the membrane filter assembly. The membrane filter assembly is provided with a clean water outlet and a sewage outlet. The filter cartridge assembly and the membrane filter assembly are respectively provided with an identification chip to match and identify an identifier installed on the water purification device. The identification chips are installed on a filter cartridge of the filter cartridge assembly and the membrane filter assembly. The booster pump is connected to the identifier. The identifier transmits a signal to propel the booster pump to work only after the identification chips are identified and paired with the identifier. The identification chip and the identifier are identification units, which can operate to identify the filter cartridge independently. Only the original filter cartridge with the identification chip on can match the water purification device to work against counterfeiting filter cartridges.

In the present invention, the identification chip and the identifier are respectively an electronic tag and a reader. The electronic tag consists of a contactless identification chip and an antenna that is provided around the contactless identification chip. The reader identifies the identification chip and exchanges information therewith via wireless radio frequency. The present invention adopts contactless automatic identification technology to carry out identification process automatically when the filter cartridge is installed in the filter cartridge assembly. The reader transmits a radio frequency signal through a built-in antenna; the electronic tag then receives the reading command through its antenna and responds the reader with product-related information. Meanwhile, the verification of password and pairing is implemented to realize automatic identification.

Preferably, the contactless identification chip is a radio frequency identification devices (RFID) chip whose work frequency band is 840-960 MHz. The contactless identification chip is provided with a data memory and a timer. The data in the data memory is able to be updated at any time, read/write, and includes information of the manufacturer, date of manufacture, check code and the like. The timer is able to record the accumulated work time of the filter cartridge in real time. When the filter cartridge reaches its expiration date, the contactless identification chip transmits a signal to cut out power supply to the booster pump to stop its work and sends a signal to remind staff to replace with a new filter cartridge.

Preferably, the antenna may be a printed antenna, an etched antenna, or a winding antenna. A variety of antennas made of different materials can be selected from on the basis of a material of the filter cartridge so as to guarantee transmission stability of the RF signals.

Preferably, the RF antenna surrounds the contactless IC in a round, triangular, square, oval or irregular shape.

The line width of the RF antenna ranges from 0.5 mm to 50 mm.

Preferably, the filter cartridge assembly comprises at least two filter cartridges. The membrane filter assembly comprises at least one membrane filter cartridge. The electronic tag is provided on each filter cartridge and each membrane filter cartridge. Only when the identification chips pair with the identifier, the identifier transmits a signal to propel the booster pump to work; this works as protection over the filter cartridge assembly and the membrane filter assembly against counterfeiting filter cartridges.

Preferably, the filter cartridge assembly comprises at least one polypropylene (PP) cotton filter cartridge and one activated carbon filter cartridge. The tap water flows through the polypropylene cotton filter cartridge for pre-filtration, and then passes the activated carbon filter cartridge for absorptive filtration. Multi-leveled filter cartridge could be provided to enhance purification degree.

Preferably, the reader reads electronic tags on multiple filter cartridges simultaneously within 50 cm.

Preferably, a water inlet solenoid valve and a low voltage switch are arranged between the booster pump and the filter cartridge assembly. The low voltage switch is connected to a water inlet of the water inlet solenoid valve. A water outlet of the water inlet solenoid valve is connected to the booster pump. The water inlet solenoid valve controls water flow. The low voltage switch is mainly used for protecting the booster pump. The protection is realized when water is at low pressure, the low voltage switch is thus in disconnection and the water therefore could not flow into the water purification device so that the booster pump is protected from idling.

In order to further improve the purifying effect, the clean water outlet of the membrane filter assembly is connected to a rearmounted activated carbon filter. A water inlet of the rearmounted activated carbon filter is provided with a pressure tank and a high voltage switch. The water inlet of the rearmounted activated carbon filter is connected to the clean water outlet of the membrane filter assembly via the high voltage switch. The purified water is thus discharged from the rearmounted activated carbon filter. The high voltage switch is a controlling switch sitting after the clean water inlet and before the pressure tank, which mainly aims at preventing excessive pressure of the pressure tank that may cause the overload of the booster pump.

Preferably, the sewage outlet of the membrane filter assembly is provided with a solenoid valve for sewage, by turning off which, sewage is prevented from continuing flowing when the water purification device is not in operation.

The membrane filter cartridge of the membrane filter assembly is a reverse osmosis membrane filter cartridge or an ultra filtration filter cartridge. The reverse osmosis membrane filter cartridge is preferably adopted in embodiments, which uses reverse osmosis technology, of high filter accuracy, able to remove $Ca^{2+}$ and $Mg^{2+}$ ions, bacteria, organic materials, inorganic materials, metal ions and radioactive substances. Being filtered through the reverse osmosis membrane filter, the water could be drinkable.

The beneficial effect of the present invention is that the water purification device provided in the present invention is able to automatically identify filter cartridge products by using the reader matching the electronic tag on the filter cartridge of the filter cartridge assembly and the membrane filter assembly. Only the original filter cartridge with the identification chip on could pass the identification process to start the water purification device. The radio frequency identification technology adopted is able to identify filter cartridge and receive product-related information. The identification process can identify multiple objects without manual intervention. The technology could identify multiple targets simultaneously. Moreover, it responds quickly and no mechanical malfunction will happen. Thus, the air purifier can operate under harsh environment and serve for a long time. The technology cracks down on the counterfeiting and assures the authenticity of the filter cartridge products and the quality of the purified water.

BRIEF DESCRIPTION OF DRAWINGS

Embodiments of the present invention are further explained clearly as follows in conjunction with figures.

DETAILED DESCRIPTION OF PREFERRED EMBODIMENTS

Figure 1:
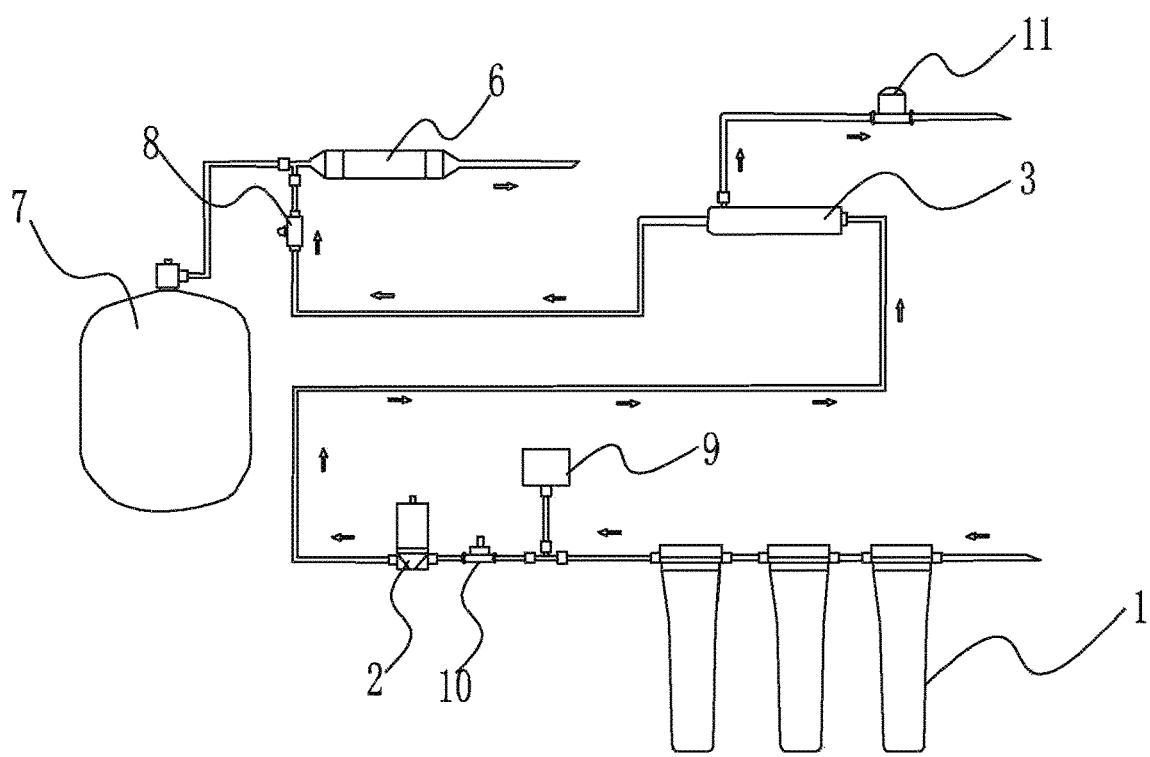
FIG. 1 is a purification principle diagram of a water purification device of the present invention.

With reference to FIG. 1, the present invention provides a water purification device based on filter cartridge anti-counterfeiting identification. The water purification device based on filter cartridge anti-counterfeiting identification comprises a filter cartridge assembly 1, a booster pump 2 and a membrane filter assembly 3. A water inlet and a water outlet of the filter cartridge assembly 1 are connected respectively to a water supply pipe and the booster pump 2. The water outlet of the booster pump 2 is connected to a water inlet of the membrane filter assembly 3. The membrane filter assembly 3 is provided with a clean water outlet and a sewage outlet. The tap water flows through the filter cartridge assembly 1 for pre-filtration and goes into the booster pump 2 so that the booster pump 2 increases the pressure of the tap water and pumps the tap water into the membrane filter assembly 3 for tertiary treatment, which removes virtually all particles to gain better purification. In order to prevent the use of counterfeit filter cartridge from prejudicing the purifying effect of the water purification device, the filter cartridge assembly 1 and the membrane filter assembly 3 are provided with an identification chip. Such identification chips are installed on a filter cartridge of the filter cartridge assembly 1 and the membrane filter assembly 3. And an identifier is therefore installed on the water purification device to identify and to match identification chips, and the booster pump 2 is connected to the identifier. Only an original filter cartridge with an identification chip on can be identified and paired with the identifier on the water purification device. The identifier transmits a signal to propel the booster pump 2 to work only after all the identification chips on all filter cartridges pass identification. Where the identification chip fails to match the identifier or where a filter cartridge lacking the identification chip is installed, the identifier will cut out power supply to the booster pump 2 to render the booster pump 2 functioning improperly, which therefore disables water purification process.

Figure 2:
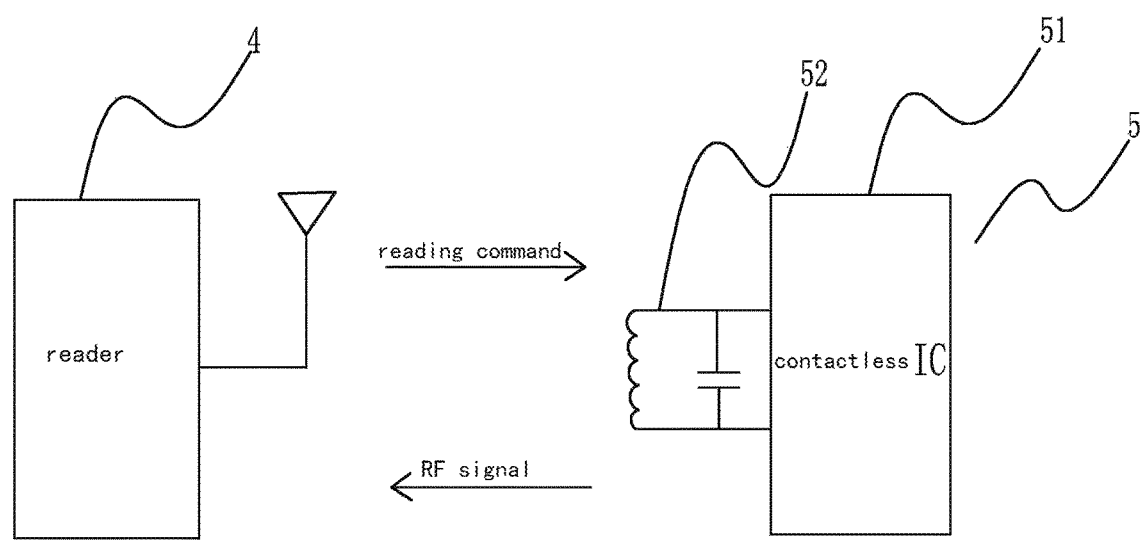
FIG. 2 is a principle diagram of an electronic tag and a reader of the present invention.

With reference to FIG. 2, the present invention adopts contactless automatic identification technology to carry out identification process automatically. This technology is applicable where identification needs to be done in near field region and without direct contact. Preferable embodiment is that the identification chip and the identifier are respectively an electronic tag 4 and a reader 5. The electronic tag 4 consists of a contactless identification chip 41 and an antenna 42 that is provided around the contactless identification chip 41. The antenna 42 may be a printed antenna, an etched antenna, or a winding antenna. The RF antenna 42 surrounds the contactless identification chip 41 in a round, triangular, square, oval or irregular shape. The line width of the RF antenna ranges from 0.5 mm to 50 mm. In order to ensure a stable signal transmission, different materials are chosen for manufacturing antenna 42 depend on different materials of the filter cartridge. The reader 5 is a RFID reader. The contactless identification chip 41 is a RFID chip whose work frequency band is 840-960 MHz. The electronic tag 4 has no internal power supply; instead, an integrated circuit in the electronic tag 4 is powered by receiving electromagnetic waves transmitted by the RFID reader 5.

When the electronic tag 4 receives signal that is strong enough, it responds the RFID reader 5 with data. Such data not only includes the only identification but also data that pre-exists in a data memory of the contactless identification chip 41. The data in the data memory is able to be updated at any time, read/write, and includes information of the manufacturer, date of manufacture, check code and the like.

In order to prompt the utility, a timer is arranged in the contactless identification chip 41. The timer is able to record the accumulated work time of the filter cartridge in real time. When the filter cartridge reaches its expiration date, the contactless identification chip 41 transmits a signal to cut out power supply to the booster pump 2 to stop its work and sends a signal to remind staff to replace with a new filter cartridge, which could be realized by installing an indicator light on the water purification device.

The filter cartridge assembly 1 adopted in the present embodiment comprises a shell and a filter cartridge. The filter cartridge is fixedly installed in the shell. The electronic tag 4 is able to be embedded in the filter cartridge since the electronic tag 4 is small and easy to be concealed. The reader 5 is installed on the shell of the filter cartridge assembly 1. When the electronic tag 4 matches the reader 5 the water purification device may keep to function properly.

Preferably, the filter cartridge assembly 1 comprises at least two filter cartridges. The membrane filter assembly 3 comprises at least one membrane filter cartridge. The electronic tags 4 are provided on each filter cartridge and each membrane filter cartridge. Specifically in the present embodiment, the electronic tags 4 are provided on the filter cartridge of the filter cartridge assembly 1 and the membrane filter cartridge of the membrane filter assembly 3 respectively; only one reader 5 is used to identify the electronic tags 4 on both filter cartridge assembly 1 and the membrane filter assembly 3. The reader 5 is installed within the identification range of each electronic tag 4; i.e., the reader 5 has to be installed where it is able to interrogate each electronic tag 4 so that the identification function could be realized. Wherein the identification range of the reader 5 is within 50 cm. Multiple readers 5 could also be provided to identify the filter cartridge assembly 1 and the membrane filter assembly 3 respectively; these readers 5 are installed on a shell of each assembly.

The filter cartridge of the filter cartridge assembly 1 comprises at least one polypropylene cotton filter cartridge and one activated carbon filter cartridge. The tap water flows through the polypropylene cotton filter cartridge for pre-filtration, and then passes the activated carbon filter cartridge for absorptive filtration. The polypropylene cotton filter cartridge is able to effectively remove various particles suspended in the filtered water. The activated carbon filter cartridge adopts highly effective activated carbon that has proper particle diameter and specific surface area that is greater than 1000 m$^2$/g. Such property endows the activated carbon filter cartridge with functions such as specific filtration at its upper level and highly effective absorption at its lower level, which dramatically strengthens the water purification, prolongs the life span of the activated carbon, effectively removes odor, organic materials, colloid, iron and residual chlorine etc. The activated carbon filter cartridge plays a favorable role in reducing turbidity and color of water, purifying water, and reducing contamination to the filter membrane. Multi-leveled filter cartridge could be provided to enhance purification degree in accordance to actual need.

The membrane filter cartridge of the membrane filter assembly 3 is a reverse osmosis membrane filter cartridge or an ultra filtration filter cartridge. The reverse osmosis membrane filter cartridge adopted in the present embodiment uses reverse osmosis technology, which is of high filter accuracy, able to remove $Ca^{2+}$ and $Mg^{2+}$ ions, bacteria, organic materials, inorganic materials, metal ions and radioactive substances. Being filtered through the reverse osmosis membrane filter, the water could be drinkable.

Preferably, the sewage outlet of the membrane filter assembly 3 is provided with a solenoid valve for sewage, by turning off which, sewage is prevented from continuing flowing when the water purification device is not in operation.

When the filter cartridge of filter cartridge assembly 1 or membrane filter assembly 3 of the water purification device needs to be replaced with a new one, the filter cartridge has to be original to be matched and identified. The identification process goes into work automatically when the filter cartridge assembly 1 or the membrane filter assembly 3 is replaced. The reader 5 transmits a radio signal through a built-in antenna; the electronic tag 4 then receives the message through its antenna 42 and responds the reader 5 with product-related information. Identification process goes into operation at the same time when the reader 5 reads and matches the verification password of the electronic tag 4. This identification process can be operated without human intervention and can identify multiple objects simultaneously, i.e., each filter cartridge of the filter cartridge assembly 1 and each membrane filter cartridge of the membrane filter assembly 3 could be read simultaneously. The reader transmits signal to propel the booster pump 2 to work only when the electronic tags on all filter cartridge match the reader. The merits of this identification process are that it responds quickly and no mechanical malfunction will happen. Thereby, the air purifier can operate under harsh environment and serve for a long time.

Preferably, a water inlet solenoid valve 10 and a low voltage switch 9 are arranged between the booster pump 2 and the filter cartridge assembly 1. The low voltage switch 9 is connected to a water inlet of the water inlet solenoid valve 10. A water outlet of the water inlet solenoid valve 10 is connected to the booster pump 2. The water inlet solenoid valve 10 controls water flow. The low voltage switch 9 is mainly used for protecting the booster pump 2. The protection is realized when water is at low pressure, the low voltage switch 9 is thus in disconnection and the water therefore could not flow into the water purification device so that the booster pump 2 is protected from idling.

In order to further improve the purifying effect, the clean water outlet of the membrane filter assembly 3 is connected to a rearmounted activated carbon filter 6. A water inlet of the rearmounted activated carbon filter 6 is provided with a pressure tank 7 and a high voltage switch 8. The water inlet of the rearmounted activated carbon filter 6 is connected to the clean water inlet of the membrane filter assembly 3 via the high voltage switch 8. The purified water is thus discharged from the rearmounted activated carbon filter 6. The high voltage switch 8 is a controlling switch sitting after the clean water inlet and before the pressure tank 7, which mainly aims at preventing excessive pressure of the pressure tank 7 that may cause the overload of the booster pump.

The wireless radio frequency identification technology adopted in the water purification device provided in the present invention is able to automatically identify filter cartridge products without human intervention. Only the original filter cartridge with the identification chip on could pass the identification process to start the water purification device. It responds quickly and no mechanical malfunction will happen. Thereby, the air purifier can operate under harsh environment and serve for a long time. The technology cracks down on the counterfeiting and assures the authenticity of the filter cartridge products and the quality of the purified water.

Hereinbefore are only preferred embodiments of the present invention, which are only used to facilitate the understanding of the present invention rather than to limit the structure of the embodiments mentioned above. Based on the embodiments of the present invention, all the other embodiments obtained by the skilled in the art being capable of achieving the effect of the present invention are within the protection scope of the present invention.

What is claimed is that:

1. A water purification device based on filter cartridge anti-counterfeiting identification comprising a filter cartridge assembly, a booster pump and a membrane filter assembly; a water inlet and a water outlet of the filter cartridge assembly are connected respectively to a water supply pipe and the booster pump, the water outlet of the booster pump is connected to a water inlet of the membrane filter assembly, the membrane filter assembly is provided with a clean water outlet and a retentate outlet, characterized in that the filter cartridge assembly and the membrane filter assembly are respectively provided with an identification chip to be paired with an identifier installed on the water purification device; the identification chips are installed on a filter cartridge of the filter cartridge assembly and the membrane filter assembly, the booster pump is connected to the identifier; the identifier transmits a signal to propel the booster pump to work only after the identification chips are identified and paired with the identifier; a water inlet solenoid valve and a low voltage switch are arranged between the booster pump and the filter cartridge assembly; the low voltage switch is connected to a water inlet of the water inlet solenoid valve; a water outlet of the water inlet solenoid valve is connected to the booster pump.

2. The water purification device based on filter cartridge anti-counterfeiting identification according to claim 1, characterized in that the identification chip and the identifier are respectively an electronic tag and a reader; the electronic tag consists of a contactless identification chip and an antenna that is provided around the contactless identification chip; the reader identifies the identification chip and exchanges information therewith via wireless radio frequency.

3. The water purification device based on filter cartridge anti-counterfeiting identification according to claim 2, characterized in that the contactless identification chip is a RFID chip whose work frequency band is 840-960 MHz; the contactless identification chip is provided with a data memory and a timer.

4. The water purification device based on filter cartridge anti-counterfeiting identification according to claim 3, characterized in that when the filter cartridge reaches the set expiration date, the timer installed in the contactless identification chip transmits a signal to the water purification device to stop work thereof.

5. The water purification device based on filter cartridge anti-counterfeiting identification according to claim 2, characterized in that the antenna may be one of a printed antenna, an etched antenna, or a winding antenna.

6. The water purification device based on filter cartridge anti-counterfeiting identification according to claim 5, characterized in that the RF antenna surrounds the contactless IC in a round, triangular, square, oval or irregular shape.

7. The water purification device based on filter cartridge anti-counterfeiting identification according to claim 5, characterized in that a line width of the antenna ranges from 0.5 mm to 50 mm.

8. The water purification device based on filter cartridge anti-counterfeiting identification according to claim 2, characterized in that the filter cartridge assembly comprises at least two filter cartridges; the membrane filter assembly comprises at least one membrane filter cartridge; the electronic tags are provided on each filter cartridge and each membrane filter cartridge; only when the identification chips are paired with the identifier, the identifier transmits a signal to propel the booster pump to work.

9. The water purification device based on filter cartridge anti-counterfeiting identification according to claim 1, characterized in that the reader reads electronic tags on multiple filter cartridges simultaneously within 50 cm.

10. The water purification device based on filter cartridge anti-counterfeiting identification according to claim 1, characterized in that the clean water outlet of the membrane filter assembly is connected to a rearmounted activated carbon filter; a water inlet of the rearmounted activated carbon filter is provided with a pressure tank and a high voltage switch; the water inlet of the rearmounted activated carbon filter is connected to the clean water outlet of the membrane filter assembly via the high voltage switch; the purified water is thus discharged from the water outlet of the rearmounted activated carbon filter.

11. The water purification device based on filter cartridge anti-counterfeiting identification according to claim 1, characterized in that the retentate outlet of the membrane filter assembly is provided with a solenoid valve for retentate.

12. The water purification device based on filter cartridge anti-counterfeiting identification according to claim 8, characterized in that the membrane filter cartridge of the membrane filter assembly is a reverse osmosis membrane filter cartridge or an ultra filtration filter cartridge.

13. The water purification device based on filter cartridge anti-counterfeiting identification according to claim 3, characterized in that the antenna may be one of a printed antenna, an etched antenna, or a winding antenna.

14. The water purification device based on filter cartridge anti-counterfeiting identification according to claim 13, characterized in that the RF antenna surrounds the contactless IC in a round, triangular, square, oval or irregular shape.

15. The water purification device based on filter cartridge anti-counterfeiting identification according to claim 13, characterized in that a line width of the antenna ranges from 0.5 mm to 50 mm.

16. The water purification device based on filter cartridge anti-counterfeiting identification according to claim 11, characterized in that the membrane filter cartridge of the membrane filter assembly is a reverse osmosis membrane filter cartridge or an ultra filtration filter cartridge.

* * * * *